Dec. 10, 1929. F. STREICH 1,738,935
DOUGH DIVIDER
Filed Jan. 14, 1928 4 Sheets-Sheet 1
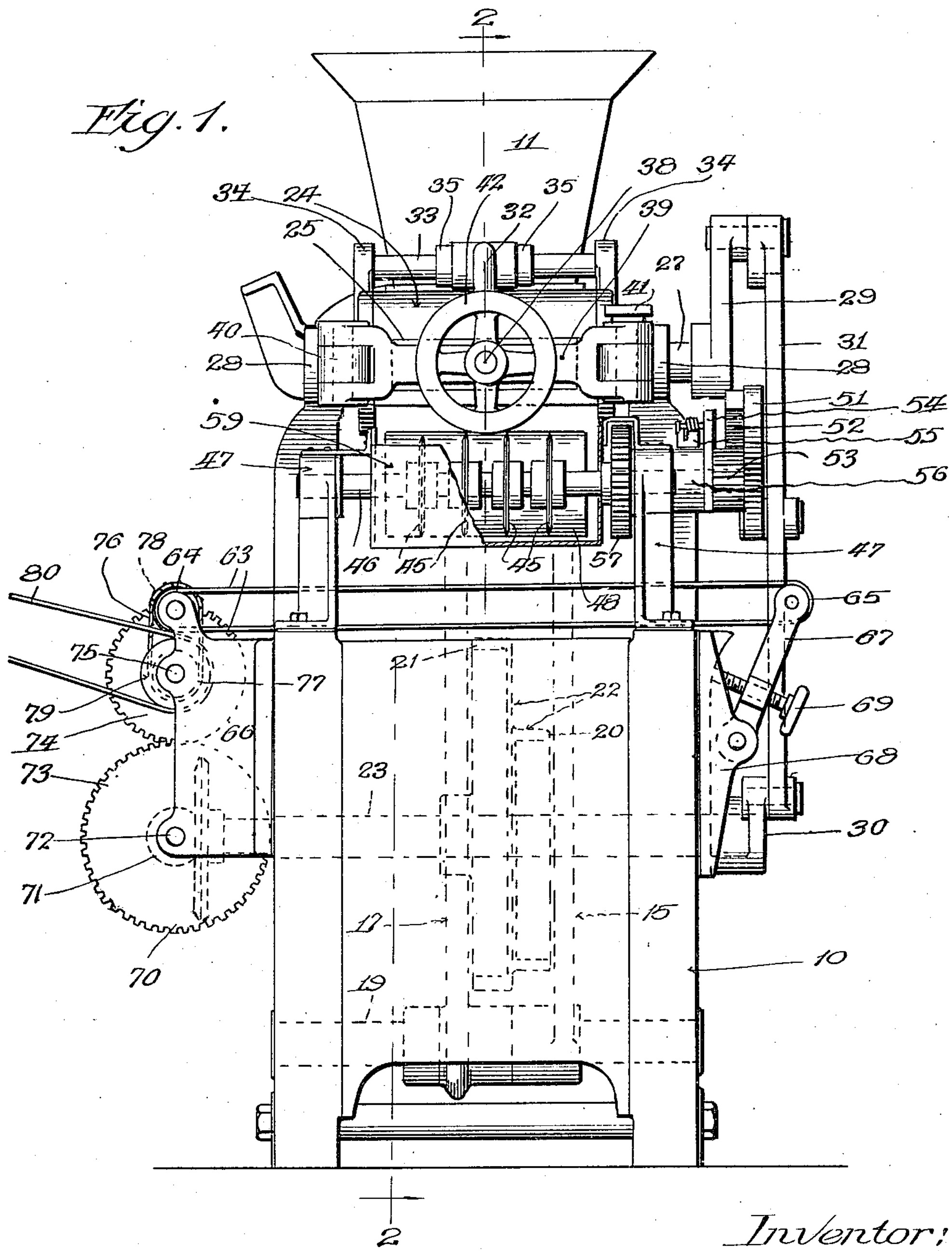
Inventor:
Frank Streich,
by Charles O. Shervey
his Atty

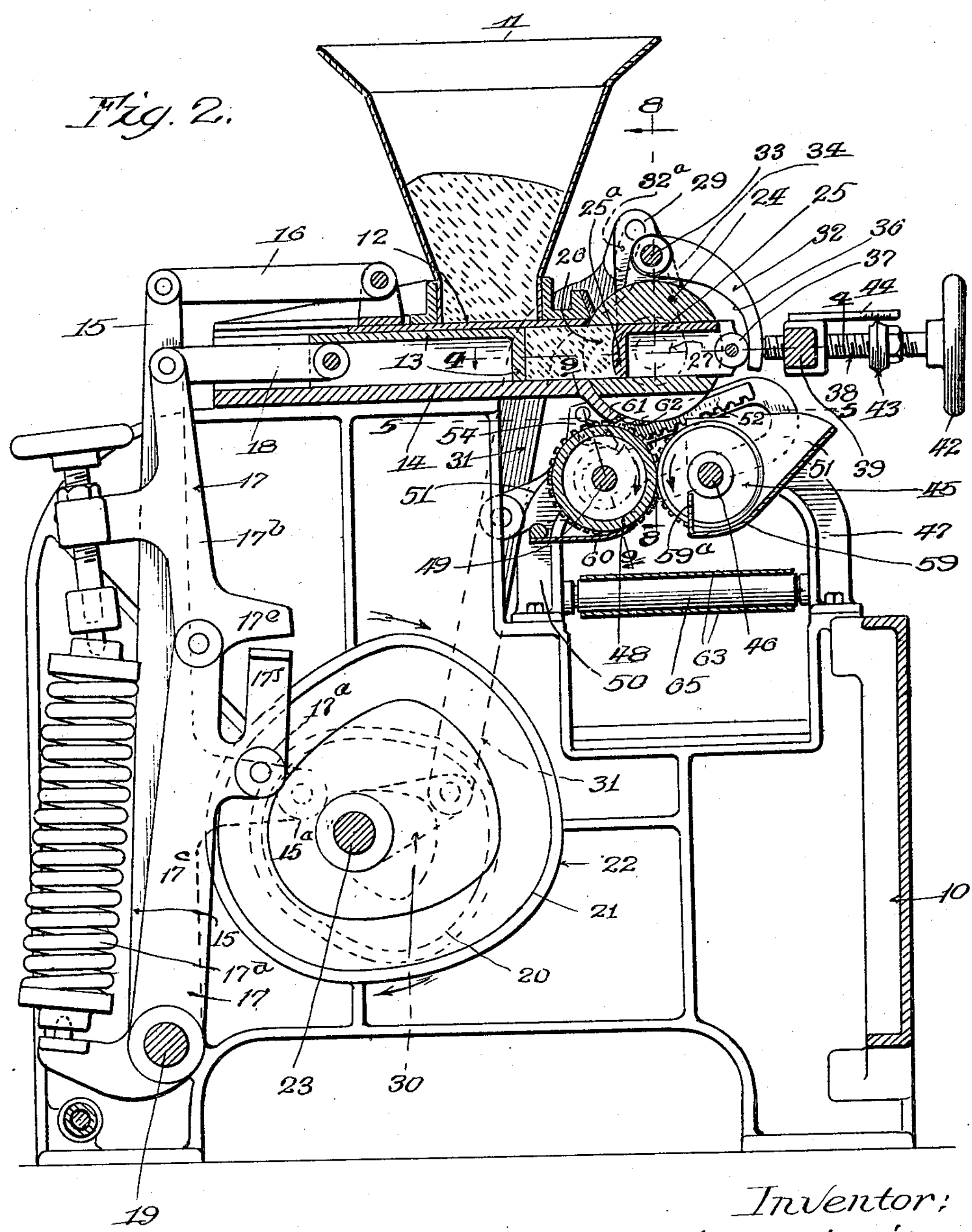
Inventor:
Frank Streich,
by Charles O. Shervey
his Atty.

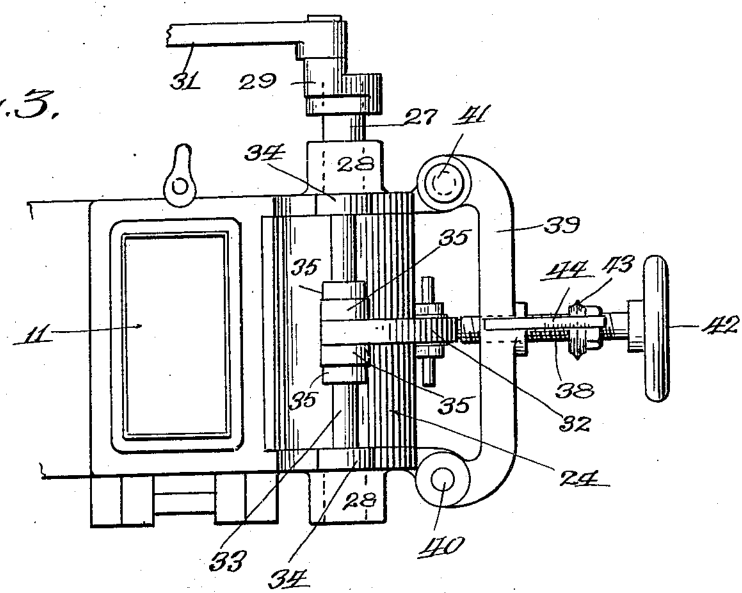
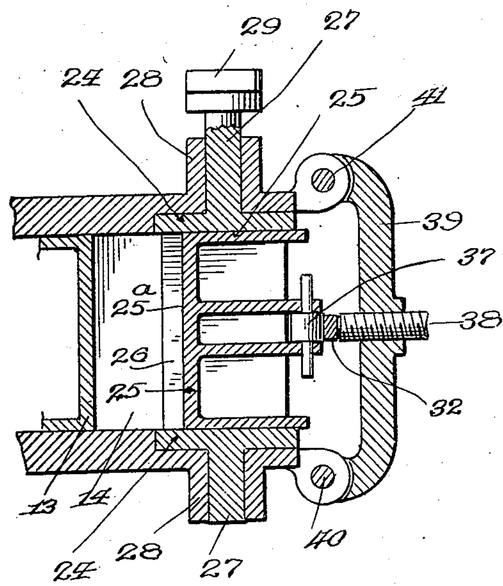
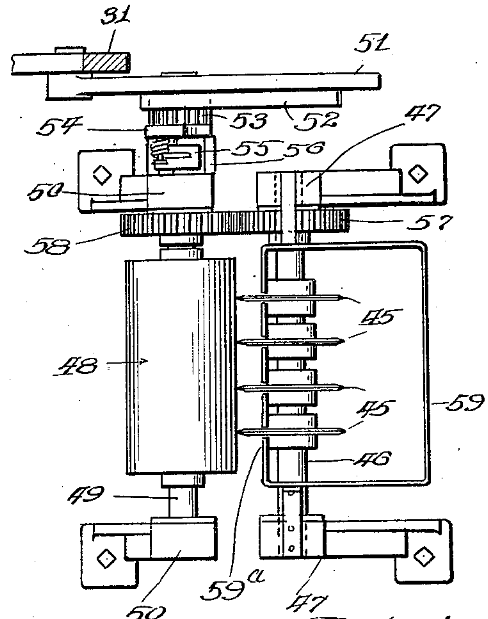
Inventor;
Frank Streich,
by Charles O. Shervey
his Atty Dec. 10, 1929. F. STREICH 1,738,935
DOUGH DIVIDER
Filed Jan. 14, 1928 4 Sheets-Sheet 4
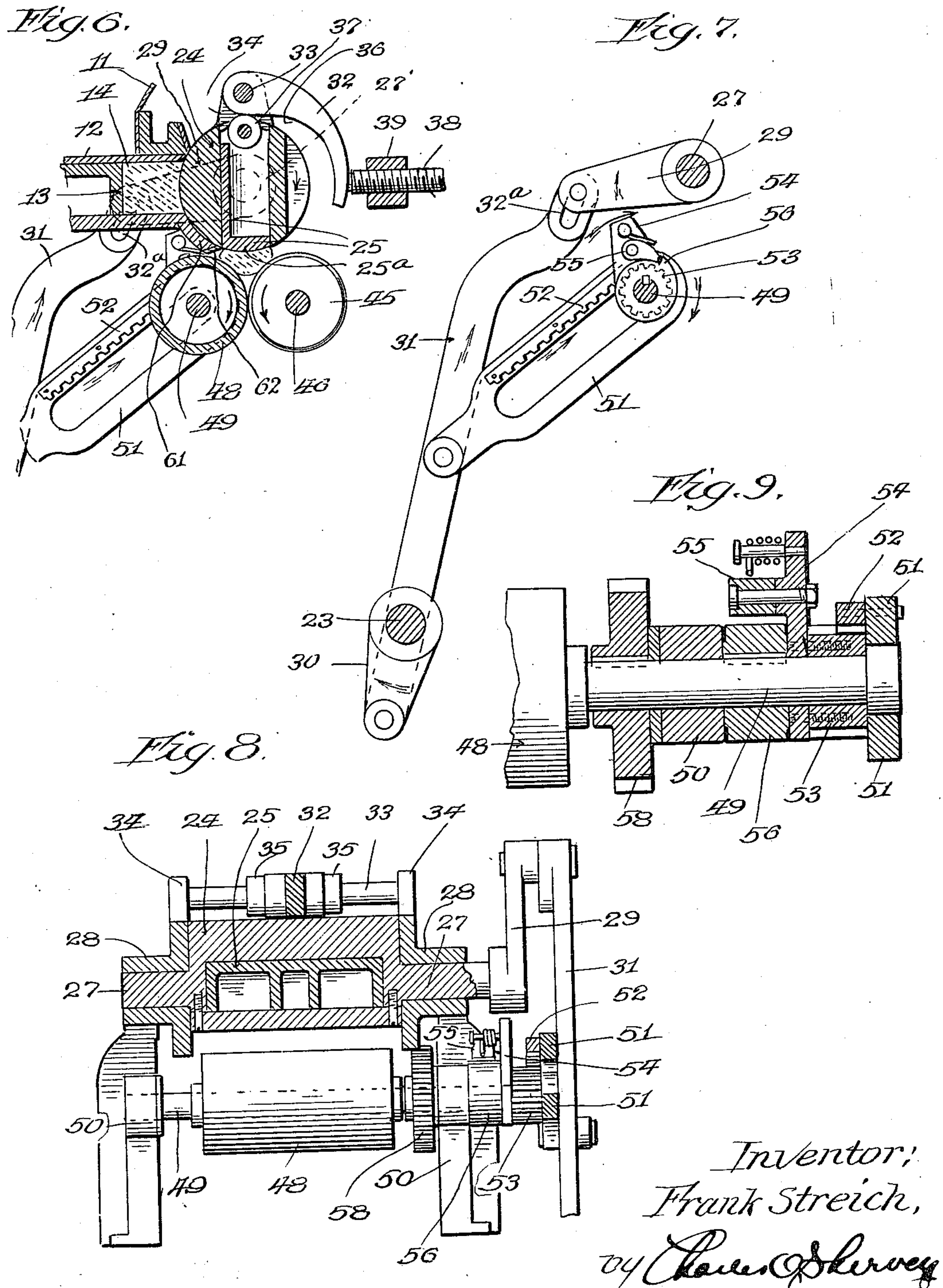
Inventor:
Frank Streich,
by Charles O. Shervey
his Att'y.

Patented Dec. 10, 1929 1,738,935

UNITED STATES PATENT OFFICE

FRANK STREICH, OF JOLIET, ILLINOIS, ASSIGNOR TO UNION MACHINERY COMPANY, OF JOLIET, ILLINOIS, A CORPORATION OF ILLINOIS

DOUGH DIVIDER

Application filed January 14, 1928. Serial No. 246,694.

This invention relates to dough dividers and its principal object is to provide improved means for dividing or separating [illegible]

[illegible]

2; Fig. 6 is a view partly in side elevation and partly in vertical longitudinal section of the dough measuring head and dough severing [illegible]

[illegible]

20, 21, and said levers are reciprocated, in timed relation to each other by said cams. As a preference the lever 17, is composed of two arms $17^b$, $17^c$, pivoted together and a coiled compression spring $17^d$, between the two arms. The spring acts to hold them in extended position, but permits the member $17^b$, to yield somewhat when the force of the spring is overcome by dough contained in the feed chamber 14, between the feed plunger 13, and the dough measuring device. Co-acting stops $17^e$, $17^f$, on the two arms $17^b$, $17^c$, of the lever 17, are provided for limiting the relative movement between the two arms in the direction imparted by the spring $17^d$. The parts thus far described constitute a common and well known type of dough divider mechanism and its construction and operation is well known to those skilled in the art to which this invention pertains.

Rotatively mounted in alignment with the feed chamber 14, is a measuring head 24, which contains a radially extending opening in which is slidably mounted a dough ejecting plunger 25, which plunger has a face $25^a$, that forms the bottom of a measuring pocket 26, into which the dough is forced by the feed plunger 13 when the measuring head is in the position illustrated in Fig. 2. Said ejecting plunger is also employed for ejecting or discharging a measured lump of dough from the pocket 26, after which the lump is severed into smaller lumps of predetermined size by dough severing mechanism as will appear more fully in the course of this specification.

The measuring head 24 is provided with trunnions or stub shafts 27, which are rotatively mounted in bearings 28, that are provided on the frame of the machine, and on the end of one of said trunnions 27 is a rocker arm 29, which is connected to a crank arm 30, fast upon the cam shaft 23, by a link or connecting rod 31. The parts just described are so proportioned and arranged that as the shaft 23 and crank arm 30 are moved through one complete revolution, the measuring head 24 is turned upon its axis of rotation from the position seen in Fig. 2 to that seen in Fig. 6 and back again. A limited amount of lost motion is provided between the link 31 and rocker arm 29 whereby said link may have a limited amount of reciprocatory movement without affecting the measuring head and said lost motion is obtained by providing a slot $32^a$ in the end of the link 31 which is connected to the rocker arm 29.

The radial opening in the measuring head 24 is of the same or substantially the same cross section as the feed chamber 14 and forms an extension of said feed chamber when the parts are in the position seen in Fig. 2. The ejecting plunger 25 fits in said opening and is capable of moving back and forth therethrough. Means are provided for limiting the movement of the ejecting plunger 25, which is caused by the introduction of dough into the pocket 26, and for moving the ejecting plunger in a direction to eject the dough from said pocket. In the form of means illustrated, a cam block or arm 32 is provided which is supported by a cross rod 33 secured in lugs 34 that are provided upon the frame of the machine, said cam block or arm 32 being held against movement along the rod 33 by collars 35, secured to said rod 33. The cam block or arm 32 has a cam face 36, which is engaged by a roller 37, mounted upon the plunger 25 and said cam face 36 is eccentrically disposed with respect to the axis of the measuring head, said cam face approaching the axis of the measuring head along a curved line as shown, whereby the plunger 25 is moved from the position shown in Fig. 2 to that shown in Fig. 6 when the roller 37 travels along said cam face from the first mentioned position of the roller to the other. Any dough contained in the pocket 26 is, therefore, ejected from the pocket as the measuring head approaches the position seen in Fig. 6.

The cam arm 32, being fulcrumed upon the rod 33, it may be adjusted thereon so as to bring its free end closer to the axis of the measuring head or farther away therefrom, as the case may be in regulating the depth of the pocket 26. The depth of the pocket is regulated by a threaded rod or screw 38 mounted in a yoke 39, which is supported by the frame of the machine. One end of the yoke may be pivoted to the frame as at 40 and the other end secured thereto by a pin 41. This arrangement provides means whereby the yoke, and parts supported thereby, may be swung back for obtaining access to the measuring head. The screw 38, may be provided with a hand wheel 42, upon one end and a disc like pointer 43 is adjustably secured upon the screw and co-operates with a measuring rod 44, mounted on the yoke and having graduations thereon for indicating the depth of the pocket. One end of the screw 38, engages with the cam arm 32 and forms a stop or abutment against which the cam arm is pressed when the dough is forced into the pocket by the feed plunger.

Below the measuring head is located the dough severing mechanism which divides the measured lump of material into smaller lumps or pieces of predetermined size. The form of severing mechanism illustrated, comprises a number of rotary, disc like knives 45, mounted upon a shaft 46, which is journaled in brackets 47, secured to and supported by the frame of the machine. Any desired number of knives may be employed, depending upon the number of lumps or pieces into which it is desired to divide the measured large lumps. Extending parallel with the axis of the knives is a roller 48 which co-operates with the knives in severing the dough, and said roller is mounted upon a shaft 49, journaled in brackets 50, secured to and mounted upon the frame of the machine. The knives and roller remain quiescent except when the measured lump of dough has been discharged from the measuring head, and they are rotated during the interval that the measuring head is being returned from the position seen in Fig. 6 to that seen in Fig. 2. The mechanism for intermittently rotating the knives 45, and roller 48, will now be described.

Connected to the link 31, is a rack supporting member 51, here shown in the form of a loop like member which surrounds the roller shaft 49. A toothed rack bar 52, is secured to the rack supporting member 51, and meshes with a pinion 53, loose upon the shaft 49. To the pinion 53, is secured a crank arm 54, which carries a spring pressed pawl 55, that is arranged to engage with a ratchet or toothed member 56, keyed or otherwise secured to the roller shaft 49. As shown the ratchet or tooth member 56, contains one tooth, the arrangement of the parts being such that the pinion 53 is rotated through one complete revolution each time that the rack bar 52 is moved in either direction, through its full length of travel, the result being that the pawl 55, is always returned to the same place, in position for engagement with the single tooth of the ratchet or toothed member 56. The ratchet being fast upon the roller shaft 49, said shaft and therewith the roller 48 are rotated whenever the ratchet or toothed member is rotated. Upon the shafts 46, 49, are intermeshing pinions 57, 58, which cause the roller 48, and knives 45, to rotate in unison and in the directions indicated by the arrows thereon.

The knives enter a flour pan 59, supported upon the brackets 47. One wall $59^a$ of the flour pan extends upwards between the knives, and is formed with slots through which the knives pass. A scraper 60 supported by the brackets 50, is provided for the roller 48, and engages with the lower face of the roller and removes any particles of dough that may adhere thereto.

The discharge end of the bottom wall of the feed chamber 14 continues along an arc of a circle, concentric with the axis of the measuring head, and provides an arcuate wall 61, on the lower edge of which is a scraper 62, which acts to scrape the measured lump away from the plunger in case it adheres thereto after being discharged from the pocket and while the measuring head is being turned back from the position seen in Fig. 6 to that seen in Fig. 2.

Below the dough severing means is a traveling apron or conveyor belt 63, upon which the individual small lumps of dough are discharged from the knives, and said apron is trained around rollers 64, 65, one of which is mounted upon a bearing bracket 66 carried by the frame of the machine and the other of which is mounted upon bracket arms 67, pivotally supported upon brackets 68, and having adjustment screws 69, engaging the brackets 68. The bracket arms 67, and adjustment screws 69, serve as a belt tightener and afford means for tightening the apron 63 in case it becomes slack. Suitable driving means is provided for the apron 63, and as shown said means comprise a beveled gear wheel 70 mounted upon the cam shaft 23 and meshing with a beveled pinion 71 mounted upon a short shaft 72, which is journaled in the bracket 66. Upon the shaft 72 is a gear wheel 73, which meshes with a gear wheel 74, fast upon a short shaft 75, also journaled in the bracket 66, and a sprocket chain 76, trained over sprocket wheels 77, 78, on the shaft 75, and shaft of the roller 64, completes the train of gearing for the apron 63. On the shaft 75, is a roller 79, of considerably greater diameter than that of the roller 64 and trained around said roller 79, is a conveyor belt 80, upon which the lumps of dough are discharged by the apron 63, and carried to another machine for a subsequent operation, as is well understood.

In the operation of the divider, a batch of dough is delivered into the hopper 11 and a quantity of the dough enters the feed chamber 14 each time that the knife 12 and plunger 13 are retracted. The knife and plunger are then moved forward and part of the dough in advance of the feed plunger is forced into the measuring pocket 26. During the forward movement of the feed plunger, the measuring head remains stationary in the position seen in Fig. 2 and this is made possible because of the lost motion connection between the link 31 and rocker arm 29. After the dough has been forced into the pocket 26, the upper end of the slot $32^a$ in the link 31 engages the wrist pin of the rocker arm 29, and as the link is moved downward by the crank arm 30, the rocker arm 29, is swung down from the position seen in Fig. 2, to that seen in Fig. 6 and the measuring head is moved therewith, the lump of dough contained in the measuring pocket being severed from the remainder in the feed chamber as the measuring head is turned from the position seen in Fig. 2 to that seen in Fig. 6. As the measuring head approaches the end of its movement, the plunger 25 is forced towards the discharge end of the pocket by reason of the engagement of the roller 37 with the eccentric or cam face of the cam arm 32. The lump of measured dough is consequently ejected from the measuring pocket 26 and falls into the space above and between the knives 45, and co-operating roller 48. As the crank arm 30 continues its rotary movement in an upward direction, the measuring head is turned back to its former position and in case the lump of dough adheres to the end face of the plunger it encounters the scraper 62, and is scraped off the plunger and falls into the space between the knives 45 and roller 48. During the downward movement of the link 31 the rack bar 52, is drawn from the position seen in Fig. 2 to that seen in Figs. 6 and 7, and the pinion 53 and therewith the crank arm 54 are turned backward through one complete revolution. As soon as the link 31 is moved in an upward direction the rack bar is moved upward and towards the right from the position seen in Fig. 7 and the pinion 53, and therewith the crank arm 54 are moved in the direction of the arrow in Fig. 7, whereupon the pawl 55 engages with the ratchet or tooth member 56, and rotates said ratchet or tooth member and therewith the shaft 49 and roller 48. The rotary knives 45 are rotated in unison with said roller 48, through the instrumentality of the intermeshing pinions 57 and 58. The measured lump of dough having lodged upon the knives 45 and roller 48, it is severed into a number of smaller lumps or pieces of predetermined size, some of which pass between the knives and others at the sides of the endmost knives, and fall upon the traveling apron 63 which conveys them to the conveyor belt 80 and discharges them upon said belt which carries them to another machine for a subsequent operation. Inasmuch as the knives rotate through the flour contained in the flour pan 59, a small quantity of flour is carried to the severed sides of the lumps, thereby preventing them from sticking together after they have been severed.

From the above it is apparent that the long lumps of dough may be accurately measured in the measuring pocket and if any air pockets occur in the long lumps they are likely to be distributed more evenly throughout the entire lump. Furthermore, that by reason of the construction and arrangement of the severing means the measured lumps may be accurately divided into smaller lumps or pieces of predetermined size and without any danger of adhering to the cutting mechanism or adhering to each other after having been divided.

More or less variation of the exact details of construction is possible without departing from the spirit of this invention; I desire, therefore, not to limit myself to the exact form of the construction shown and described, but intend, in the following claims to point out all of the invention disclosed herein.

I claim as new, and desire to secure by Letters Patent:

1. In a dough divider, the combination with a rotary measuring head having a pocket in which the material is measured, an ejecting plunger sliding in said pocket, and means for oscillating said measuring head, of a pivotally mounted cam member having a face non-concentric with respect to the axis of rotation of the measuring head, one end of said cam member being adjustable toward and away from the axis of rotation of the measuring head, and abutment means for said cam member.

2. In a dough divider, the combination with a rotary measuring head having a pocket in which the material is measured, an ejecting plunger sliding in said pocket, and means for oscillating said measuring head, of a pivotally mounted cam member having a face non-concentric with respect to the axis of rotation of the measuring head, one end of said cam member being adjustable toward and away from the axis of rotation of the measuring head, and adjustably mounted abutment means for said cam member for regulating the depth of said measuring pocket.

3. In a dough divider, the combination with a rotary measuring head having a pocket in which the material is measured, an ejecting plunger sliding in said pocket, and means for oscillating said measuring head, of a cam arm support, a cam arm fulcrumed thereon and having a cam face non-concentric with respect to the axis of the measuring head, a support and an adjustment screw mounted in said support and forming an adjustable abutment for said cam arm.

4. In a dough divider, the combination with an oscillatory measuring head having a pocket in which the material is measured, an ejecting plunger sliding in said pocket, and means for actuating said plunger, of a rotary dough severing member and a rotary co-operating member located adjacent the measuring head in position to receive dough discharged therefrom and operating to sever the ejected measured material into smaller pieces of predetermined size, and actuating means for oscillating the measuring head and rotating said dough severing members.

5. In a dough divider, the combination with a measuring head having a pocket in which the material is measured, an ejecting plunger sliding in said pocket, and means for actuating said plunger, of several rotary dough severing knives and a rotary co-operating member located below said measuring head and operating to sever the measured material into smaller pieces of predetermined size, and actuating means for rotating said knives and co-operating member.

6. In a dough divider, the combination with a measuring head having a pocket in which the material is measured, an ejecting plunger sliding in said pocket, and means for actuating said plunger, of a rotary dough severing member and a rotary co-operating roller located below the measuring head and operating to sever the measured material into smaller pieces of predetermined size, and actuating means for rotating said dough severing members.

7. In a dough divider, the combination with a measuring head having a pocket in which the material is measured, an ejecting plunger sliding in said pocket, and means for actuating said plunger, of several rotary dough severing knives and a rotary co-operating roller located below said measuring head and operating to sever the measured material into smaller pieces of predetermined size, and actuating means for rotating said knives and co-operating member.

8. In a dough divider, the combination with a measuring head having a pocket in which the material is measured, an ejecting plunger sliding in said pocket, and means for actuating said plunger, of a rotary dough severing member and a rotary co-operating member located below the measuring head and operating to sever the measured material into smaller pieces of predetermined size, and intermittently acting mechanism for rotating said dough severing member and co-operating member in timed relation to the movements of the ejecting plunger whereby the ejected measured dough is severed into smaller pieces of predetermined size.

9. In a dough divider, the combination with a measuring head having a pocket in which the material is measured, an ejecting plunger sliding in said pocket and means for actuating said plunger, of rotary dough dividing knives and a roller co-operating therewith and located below said measuring head, shafts for said knives and roller, intermeshing pinions on said shafts, and means for intermittently rotating said roller.

10. In a dough divider, the combination with a rotary, reciprocatory measuring head having a pocket in which the material is measured, an ejecting plunger sliding in said pocket and means for actuating said plunger, of rotary lump severing mechanism located below said measuring head, and an actuating member operatively connected to said measuring head and to said lump severing mechanism.

11. In a dough divider, the combination with a rotary, reciprocatory measuring head having a pocket in which the material is measured, an ejecting plunger sliding in said pocket and means for actuating said plunger, of rotary lump severing mechanism located below said measuring head, a reciprocatory link operatively connected to said measuring head, a rack supporting member connected to said link, a rack bar on said supporting member, a pinion meshing with said rack bar, and pawl and ratchet mechanism operatively connecting said pinion with said lump severing mechanism.

12. In a dough divider, the combination with a rotary, reciprocatory measuring head, having a pocket in which the material is measured, an ejecting plunger in said pocket and means for actuating said plunger, of a plurality of dough severing knives and a co-acting roller, rotatively mounted below said measuring head and means for intermittently rotating said dough severing knives and co-acting roller.

13. In a dough divider, the combination with a drive shaft, a crank arm thereon, a rotary, reciprocatory measuring head having a pocket in which the material is measured, an ejecting plunger sliding in said pocket, a stationary cam arm engaging with said plunger, a rocker arm connected to said measuring head and a link connecting said rocker arm with said crank arm, of co-acting, rotary, dough severing members located below said measuring head and operative connections between said dough severing members and said link for rotating said dough severing members.

14. In a dough divider, the combination with a drive shaft, a crank arm thereon, a rotary, reciprocatory measuring head having a pocket in which the material is measured, an ejecting plunger sliding in said pocket, a stationary cam arm engaging with said plunger, a rocker arm connected to said measuring head and a link connecting said rocker arm with said crank arm, of co-acting, rotary, dough severing members located below said measuring head and means for intermittently rotating said dough severing members.

15. In a dough divider, the combination with a measuring head having a pocket in which the material is measured, an ejecting plunger in said pocket and means for actuating said plunger, of co-acting, rotary, dough severing members located adjacent said measuring head and means for rotating said dough severing members.

16. In a dough divider, the combination with a measuring head having a pocket in which the material is measured, an ejecting plunger in said pocket and means for actuating said plunger, of intermittently rotated, co-acting, dough severing members located below said measuring head.

FRANK STREICH.